(12) United States Patent
Yachi et al.

(10) Patent No.: US 6,561,664 B2
(45) Date of Patent: May 13, 2003

(54) SHEET-LIKE LIGHT SOURCE DEVICE

(75) Inventors: Shigeru Yachi, Kikuchi-gun (JP); Atsushi Itoh, Kikuchi-gun (JP)

(73) Assignee: Advanced Display Inc., Kikuchi-gun (JP)

( * ) Notice: Subject to any disclaimer, the term of this patent is extended or adjusted under 35 U.S.C. 154(b) by 0 days.

(21) Appl. No.: 09/824,773

(22) Filed: Apr. 4, 2001

(65) Prior Publication Data

US 2001/0028560 A1 Oct. 11, 2001

(30) Foreign Application Priority Data

Apr. 6, 2000 (JP) ..................................... 2000-105310

(51) Int. Cl.[7] ............................................. F21V 7/04
(52) U.S. Cl. ............................... 362/31; 362/26; 349/65
(58) Field of Search .......................... 349/58, 59, 65; 362/26, 31, 561

(56) References Cited

U.S. PATENT DOCUMENTS

| | | | | |
|---|---|---|---|---|
| 5,546,203 A | * | 8/1996 | Takao ........................... | 362/31 |
| 5,986,726 A | * | 11/1999 | Murai ........................... | 349/58 |
| 5,988,827 A | * | 11/1999 | Lee .............................. | 362/31 |
| 6,055,029 A | * | 4/2000 | Kurihara et al. ............... | 362/31 |
| 6,295,405 B1 | * | 9/2001 | Jannson et al. ................ | 362/31 |
| 6,340,232 B1 | * | 1/2002 | Knoll et al. ................... | 362/31 |
| 6,362,860 B1 | * | 3/2002 | Sagawa ........................ | 349/59 |

* cited by examiner

*Primary Examiner*—Sandra O'Shea
*Assistant Examiner*—Peggy A Neils
(74) *Attorney, Agent, or Firm*—Oblon, Spivak, McClelland, Maier & Neustadt, P.C.

(57) ABSTRACT

A sheet-like light source device of edge-light type comprising at least a light source, a light-conducting plate and a retention member for retaining the light-conducting plate. At least one convex portion or concave portion is provided on a lateral surface portion of the light-conducting plate other than a light-incident portion with the light-conducting plate being held in a specified positional relationship by means of the retention member formed with a concave portion or a convex portion which fits with the convex portion or concave portion of the light-conducting plate. A light-absorbing means is provided on at least a surface portion of either surface of the concave portion or convex portion of the retention member. It is possible to eliminate occurrence of abnormal emission of light and decreases in luminance so that the display quality of the display might be maintained.

13 Claims, 10 Drawing Sheets

SHEET-LIKE LIGHT SOURCE DEVICE

BACKGROUND OF THE INVENTION

The present invention relates to a sheet-like light source device. More particularly, the present invention relates to a sheet-like light source device of edge-light type which is employed as a light source in a liquid crystal display device.

A liquid crystal panel is generally so arranged that liquid crystal material is pinched between two opposing substrates and that voltage is selectively impressed onto the liquid crystal material. The transmittance of light is controlled for each pixel by arranging the panel in such a manner, for instance, that pixel electrodes comprising transparent conductive films aligned in a matrix-like manner are provided on at least either of the substrates and that switching elements such as transistors for selectively impressing voltage on each of the pixel electrodes are provided.

Since the liquid crystal panel itself is not capable of emitting light, it is generally required that a light source, that is, a back light is provided on a rear surface thereof to make the panel function as a display. There are conventionally known liquid crystal display devices wherein light-conducting plates are disposed on display surfaces of liquid crystal panels and further employing sheet-like light source devices of edge-light (side-light) type wherein light sources (such as fluorescent tubes) are disposed on edges of the light-conducting plates for the purpose of achieving downsizing which is an important feature of liquid crystal panels.

An example of such a sheet-like light source device is illustrated in FIG. 15 (see FIG. 5 of Japanese Unexamined Patent Publication No. 152577/1997). In FIG. 15, 51 denotes a light-conducting plate, 52 convex portions provided on lateral sides of the light-conducting plate 51, 53 a white-colored retention member, and 54 concave portions provided on the retention member 53 to fit the convex portions 52 of the light-conducting plate 51. 55 denotes a light-incident portion wherein a tubular light source (cold cathode tube) 56 is disposed in proximity thereof.

According to such a sheet-like light source device, it is possible to realize a liquid crystal display device of narrow frame edge with improved mechanical strength against impact in which degradations in luminance in proximities of both ends of the tubular light source might be restricted.

In such a sheet-like light source device, light which is emitted from light source 56 is made incident to the light-conducting plate 51 through the light-incident portion 55 and is propagated through the light-conducting plate 51. In this process of propagation, light is scattered by means of a light-scattering means provided on a reflecting surface or an emitting surface of the light-conducting plate 51 to emit from the emitting surface. In order to improve luminance of the emitting surface, the retention member 53 is generally formed of white-colored material exhibiting a high surface reflectance. The retention member 53 serves to reflect light which did not emit from the emitting surface of the light-conducting plate 51 but from side surfaces of the retention member 53 for returning the same to the light-conducting plate 51.

In a conventional sheet-like light source device, abnormal emission of light will occur on surface portions of the emitting surface located remote from the light-incident portion of the convex portions 52, which might lead to degradations in display qualities. This fact will be explained now with reference to FIGS. 16 to 17. FIG. 16 is a perspective view of the convex portion 52 on the right-hand side of the light-conducting plate 51 of the sheet-like light source device, and FIG. 17 is a perspective view of the concave portion 54 on the right-hand side of the retention member 53.

In FIG. 16, light which is made incident from the light-incident portion 55 of the light-conducting plate 51 is propagated through the light-conducting plate 51 while a part thereof is outgoing from the surface portion 52a of the emitting surface located remote from the light-incident portion 55 in a direction as indicated by the arrow as emitting light 60. As further illustrated in FIG. 17, the outgoing light 60 is scattered by a surface portion 54a of the concave portion 54 of the retention member 53 which opposes the surface portion 52a of the convex portion 52 of the light-conducting plate 51.

Since such scattered light 61 is recognized as partial irregularities in luminance (abnormal emission of light) in proximities thereof, which will be a cause to degrade the display quality when used as a display.

The present invention has been made in view of the above facts, and it is an object thereof to provide a sheet-like light source device which is free of abnormal emission of light and free of degradations in luminance.

SUMMARY OF THE INVENTION

In accordance with the present invention, there is provided a sheet-like light source device of edge-light type comprising at least a light source, a light-conducting plate and a retention member for retaining the light-conducting plate, wherein at least one convex portion or concave portion is provided on a lateral surface portion of the light-conducting plate other than a light-incident portion with the light-conducting plate being held in a specified positional relationship by means of the retention member formed with a concave portion or a convex portion which fits with the convex portion or concave portion of the light-conducting plate, and wherein a light-absorbing means is provided on at least a surface portion of either surface of the concave portion or convex portion of the retention member which opposes the light-incident portion of the light-conducting plate.

In accordance with the present invention, there is also provided a sheet-like light source device of edge-light type comprising at least a light source, a light-conducting plate and a retention member for retaining the light-conducting plate, wherein at least one convex portion or concave portion is provided on a lateral surface portion of the light-conducting plate other than a light-incident portion with the light-conducting plate being held in a specified positional relationship by means of the retention member formed with a concave portion or a convex portion which fit with the convex portion or concave portion of the light-conducting plate, and wherein a light-transmitting means is provided on at least a surface portion of either surface of the concave portion or convex portion of the retention member which opposes the light-incident portion of the light-conducting plate.

In accordance with the present invention, there is farther provided a sheet-like light source device of edge-light type comprising at least a light source, a light-conducting plate and a retention member for retaining the light-conducting plate, wherein at least one convex portion or concave portion is provided on a lateral surface portion of the light-conducting plate other than a light-incident portion with the light-conducting plate being held in a specified positional relationship by means of the retention member formed with a concave portion or a convex portion which fit with the convex portion or concave portion of the light-conducting plate, and wherein a light-absorbing means is provided on at least a surface portion of a light emitting surface of either surface of the concave portion or convex portion of the light-conducting plate.

DETAILED DESCRIPTION

Embodiment 1

Figure 1:
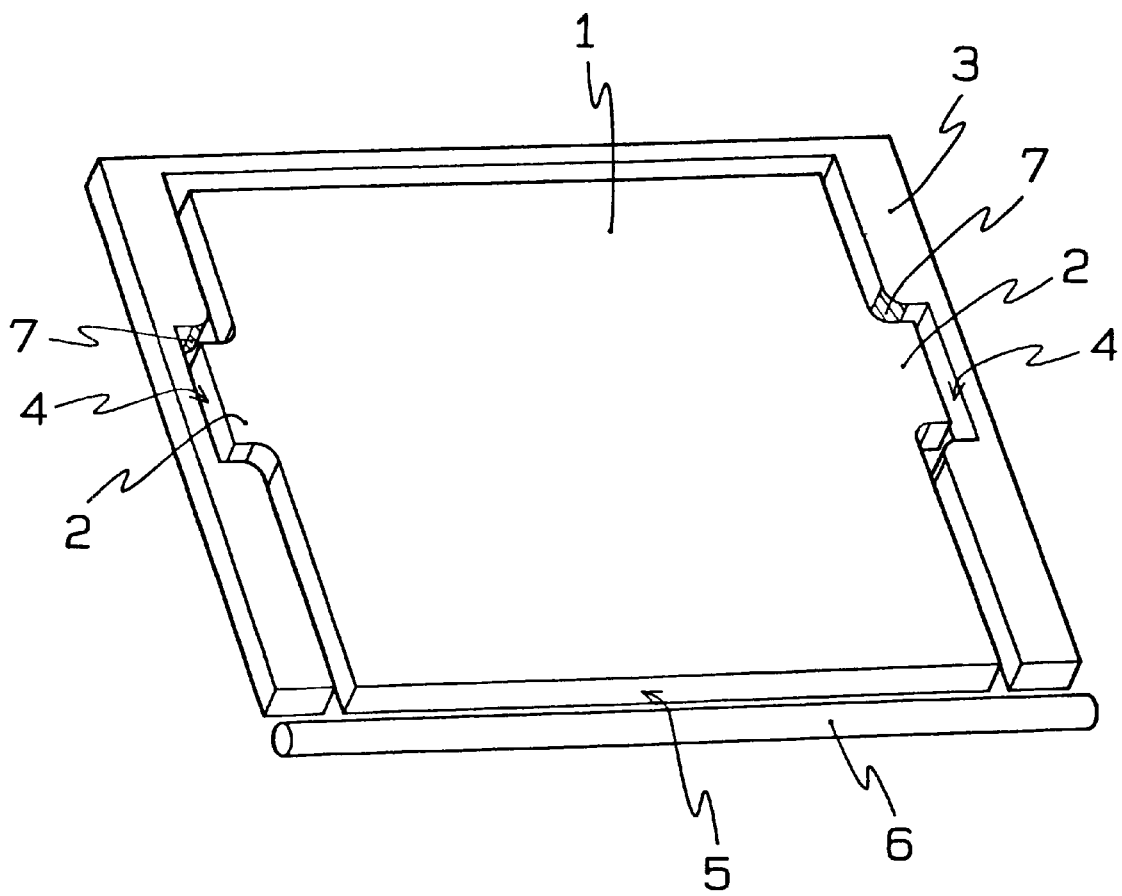
FIG. 1 is a perspective view showing a sheet-like light source device according to Embodiment 1 of the present invention.
Figure 2:
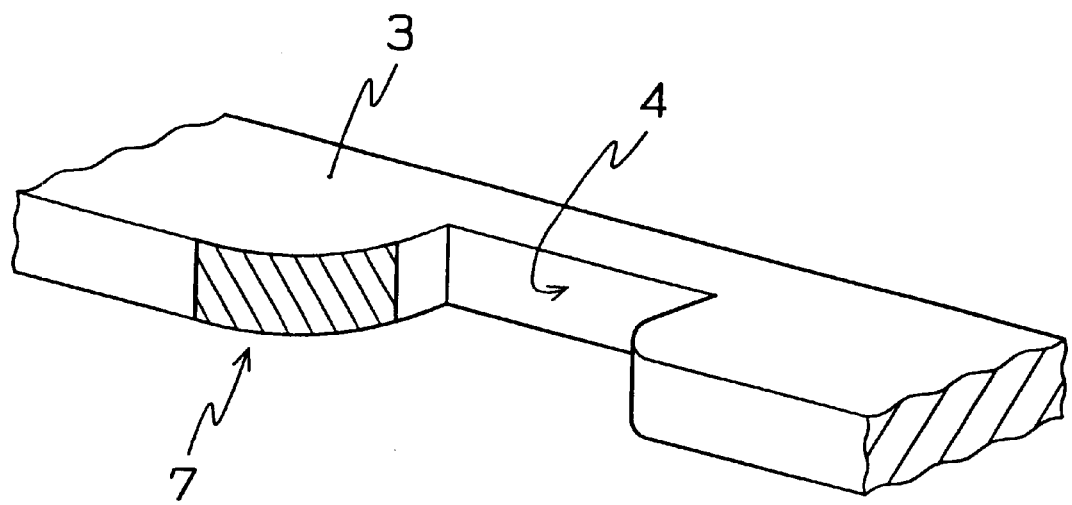
FIG. 2 is an enlarged perspective view of a concave portion located on a right-hand side of a retention member of FIG. 1.
Figure 3:
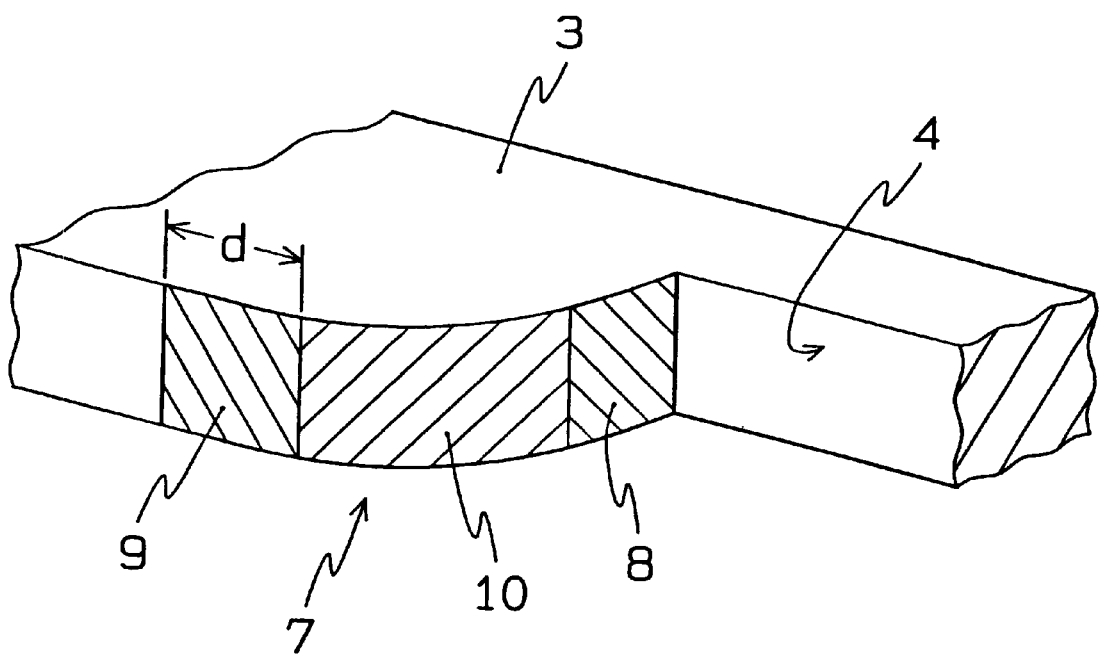
FIG. 3 is a view for explaining a region to be coated.

FIG. 1 is a perspective view showing a sheet-like light source device according to Embodiment 1 of the present invention, FIG. 2 is an enlarged perspective view of a concave portion located on a right-hand side of a retention member of FIG. 1, and FIG. 3 is a view for explaining a region to be coated. In FIG. 1, 1 denotes a light-conducting plate, 2 a convex portion provided on a lateral surface of the light-conducting plate 1, 3 a retention member, and 4 a concave portion provided on the retention member 3 to fit with the convex portion 2 of the light-conducting plate 1. 5 denotes a light-incident portion to which proximity a light source 6 is disposed.

No abnormal emission of light of a surface portion of the concave portion 4 will be generated when changing the color of the retention member 3 from conventionally used white to a colored one since light emitting from the convex portion 2 will not be irregularly reflected but absorbed. However, since all of the light emitting from the lateral surface of the light-conducting plate 1 will be absorbed, the luminance of the display will be reduced by approximately 7%.

It has accordingly been provided for a light-absorbing means 7 on a surface portion of the concave portion 4 of the retention member 3 which opposes the light-incident portion 5. The light-absorbing means might be a black or gray colored coating. It should be noted that regions for coating the colored coating is shown as hatched portions in FIGS. 1 to 3 for ease of understanding. While the coating region shall at least be R surface portion 10 which connects A plane 8 and B plane 9, it is preferable to coat A plane 8 and B plane 9 as well. The coating regions of, for instance, the A plane 8 and B plane 9 are suitably determined within a range onto which leakage light (emitting light) hits, wherein a maximum range for A plane 8 is the entire surface while that for B plane 9 is set to be approximately d=5 mm from a boundary with the R surface portion 10.

The colored coating might be a commercially available one such as oil-based ink, acrylic coating or lacquer coating. The colored coating might be applied by using a pen, a brush or a spray upon completion of the retention member 3.

It should be noted that while the colored coating used in Embodiment 1 is a black or gray coating, the present invention is not limited to such black or gray coating as long as the color exhibits a function of absorbing emitting light in problem.

In the sheet-like light source device according to Embodiment 1, light which is emitting from a surface portion of the convex portion 2 of the light-conducting plate 1 located remote from the light-incident portion 5 is absorbed by the colored coating which is the light-absorbing means 7 of the retention member 3, so that no scattering will be generated at this portion. It is accordingly possible to eliminate abnormal emission of light and to maintain the display quality of the display.

Since the light-absorbing means 7 is provided on a portion at which abnormal emission of light will be problematic, light which is emitting from other portions of the lateral surface of the light-conducting plate 1 will be reflected at the retention member 3 and returned to the light-conducting plate 1 without being absorbed, and it is possible to prevent degradations in luminance.

It should be noted that while the light-absorbing means 7 has been formed by coating a colored coating, it is alternatively possible to form the same by transferring a colored film, for instance, a film with a colored layer being formed on a surface thereof or a film impregnated with a coloring agent (pigment), onto the same region through application of heat or pressure. While various transferring methods might be employed, it is possible to put the film to specified position upon completion of the retention member 3 and applying heat or pressure from above, or, in case the retention member 3 is formed by injection molding, it is also possible to transfer the film by inserting the film into the mold at the time of molding.

Embodiment 2

Figure 4:
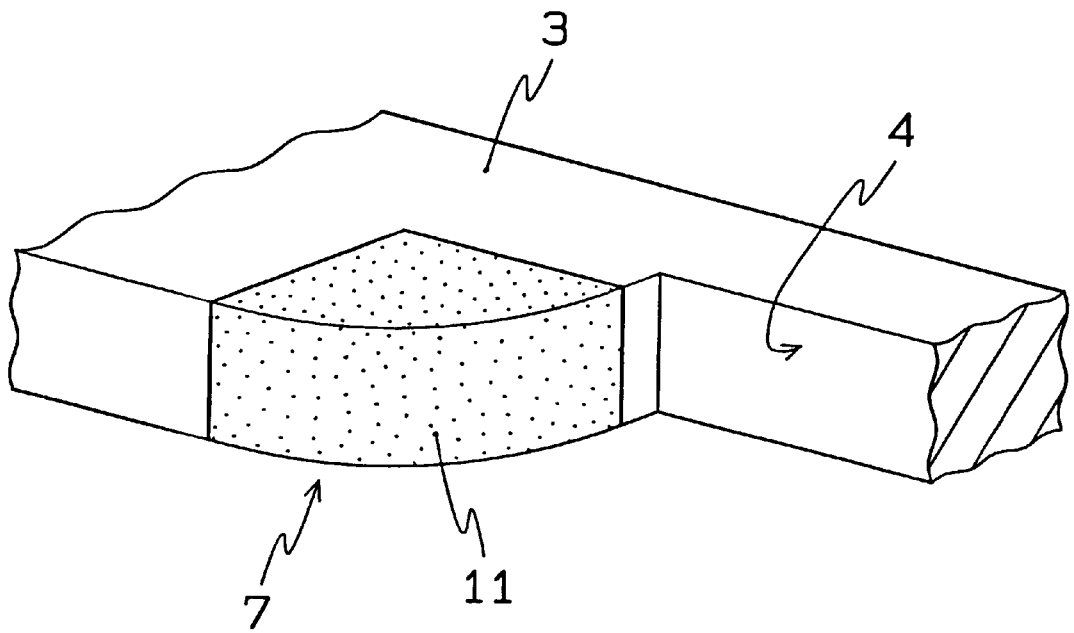
FIG. 4 is a perspective view of a concave portion located on a right-hand side of a retention member of a sheet-like light source device according to Embodiment 2 of the present invention.

FIG. 4 is a perspective view of a concave portion located on a right-hand side of a retention member of a sheet-like light source device according to Embodiment 2 of the present invention. In Embodiment 2, a colored resin molded body 11 is provided as a light-absorbing means 7 at a partially notched portion of the concave portion 4 of the retention member 3. The dimension of the colored resin molded body 11 is set such that the dimension of a surface opposing the light-conducting plate 1 (surface region on the light source side) is identical to the coating region as described in the above Embodiment 1 (see FIG. 3).

No abnormal emission of light will be generated also in Embodiment 2 due to the same principle as that of Embodiment 1, and since light emitting from the lateral surface of the light-conducting plate will hardly be absorbed by the retention member 3, it is possible to realize a display of favorable display quality and free of degradations in luminance. While it is preferable that the colored resin molded body is black or gray, the color is not limited to black or gray, as already mentioned in the above Embodiment 1, as long as the color exhibits functions of absorbing emitting light.

The colored resin molded body 11 might be formed as a separate member through molding or cutting processing, it is alternatively possible to form the same through so-called two-colored molding, in case the retention member 3 is formed through injection molding, wherein the light-absorbing portion is formed by using colored resin while the remaining portions by using white resin. When employing the two-colored molding method, it is possible to restrict increases in assembling costs since it is possible to omit a subsequent process of assembling separate members.

In performing two-colored molding, the resin material shall be one which might be colored to be both white and colored and which exhibits favorable adhesiveness of adhering surfaces of resin of different colors, and examples of preferably used materials are polycarbonate (PC), PC-ABS, ABS or acrylic resin.

Embodiment 3

Figure 5:
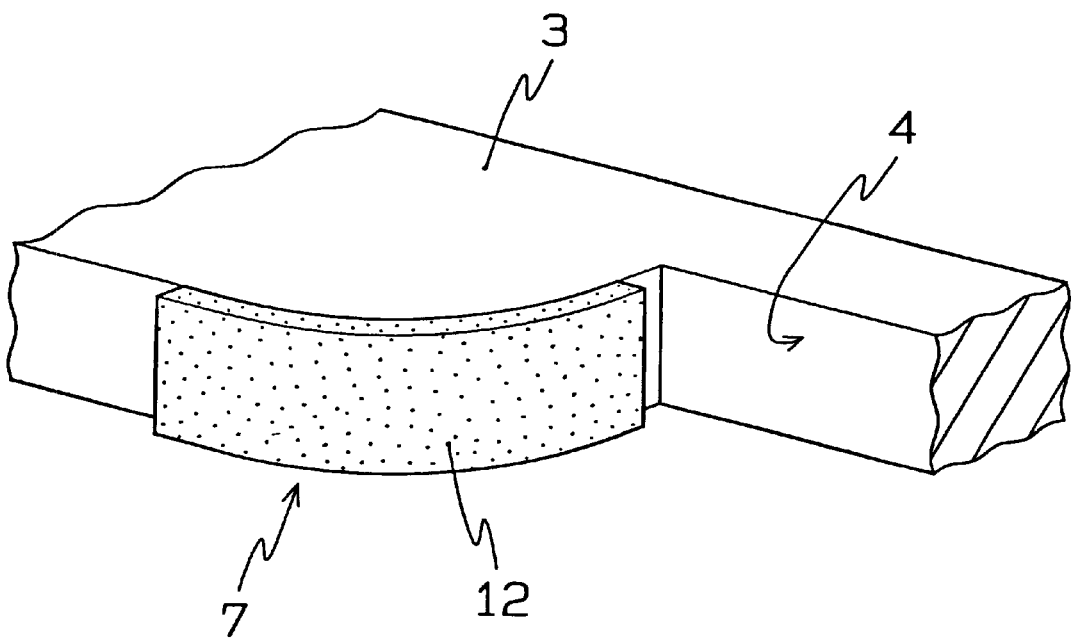
FIG. 5 is a perspective view of a concave portion located on a right-hand side of a retention member of a sheet-like light source device according to Embodiment 3 of the present invention.
Figure 6:
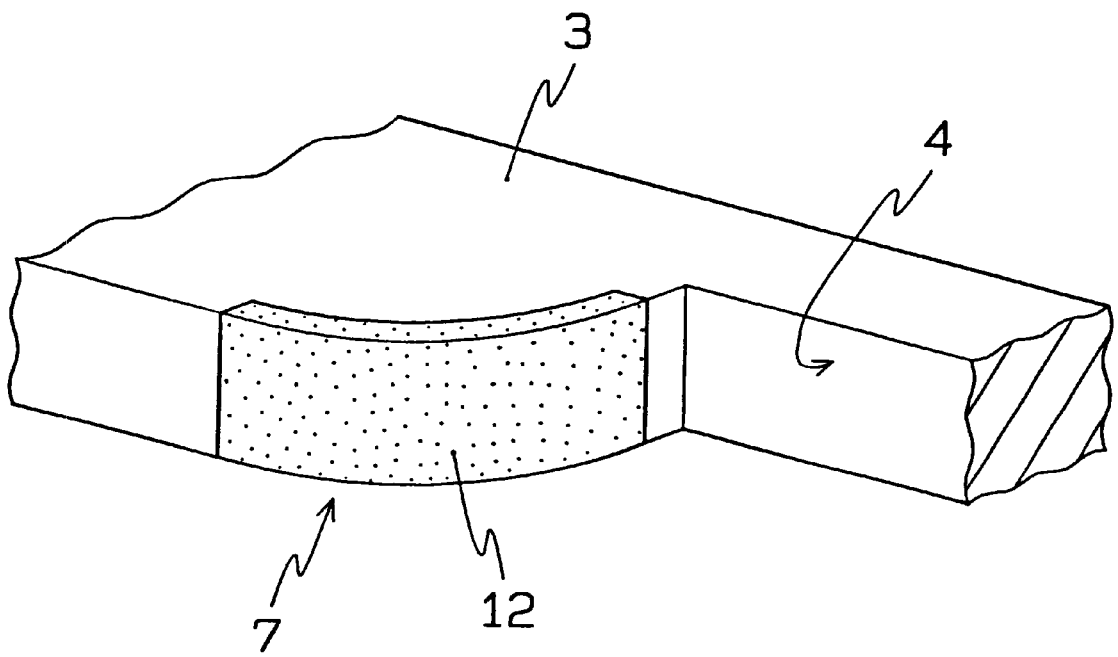
FIG. 6 is a view showing another way of adhering a colored tape.

FIG. 5 is a perspective view of a concave portion located on a right-hand side of a retention member of a sheet-like light source device according to Embodiment 3 of the present invention, and FIG. 6 is a view showing another way of adhering a colored tape. As illustrated in FIGS. 5 and 6, a colored tape 12 is adhered to the surface portion of the concave portion 4 of the retention member 3 opposing the light-incident portion of the light-conducting plate or a surface portion at which the concave portion 4 is partially notched to serve as the light-absorbing means 7. The same effects as those of Embodiment 1 and Embodiment 2 might be achieved also in Embodiment 3. The dimension of the colored tape 12 shall be set such that the dimension of a surface opposing the light-conducting plate 1 is identical to the coating region as described in the above Embodiment 1 (see FIG. 3). Further, while it is preferable that the colored resin molded body is black or gray, the color is not limited to black or gray, as long as the color exhibits functions of absorbing emitting light.

The colored tape 12 is preferably one which is as thin as possible and which is of favorable stability of adhesiveness, and it might, for instance, be a tape or a cellophane tape using PET as a base material and having a thickness of approximately several tens of μm. In this case, the tape might be directly adhered to the surface portion (outside surface) of the retention member 3 without causing any problems in view of clearance between the light-conducting plate 1 and the retention member 3. In case of adhering a thick tape such as a cushioned tape formed of silicon rubber or the like, it is preferable to employ a shape in which the surface portion of the concave portion 4 of the retention member 3 is cut by a thickness of the tape as illustrated in FIG. 6. It should be noted that it is of course possible to employ the arrangement of FIG. 6 also in case of employing a tape of small thickness.

Embodiment 4

Figure 7:
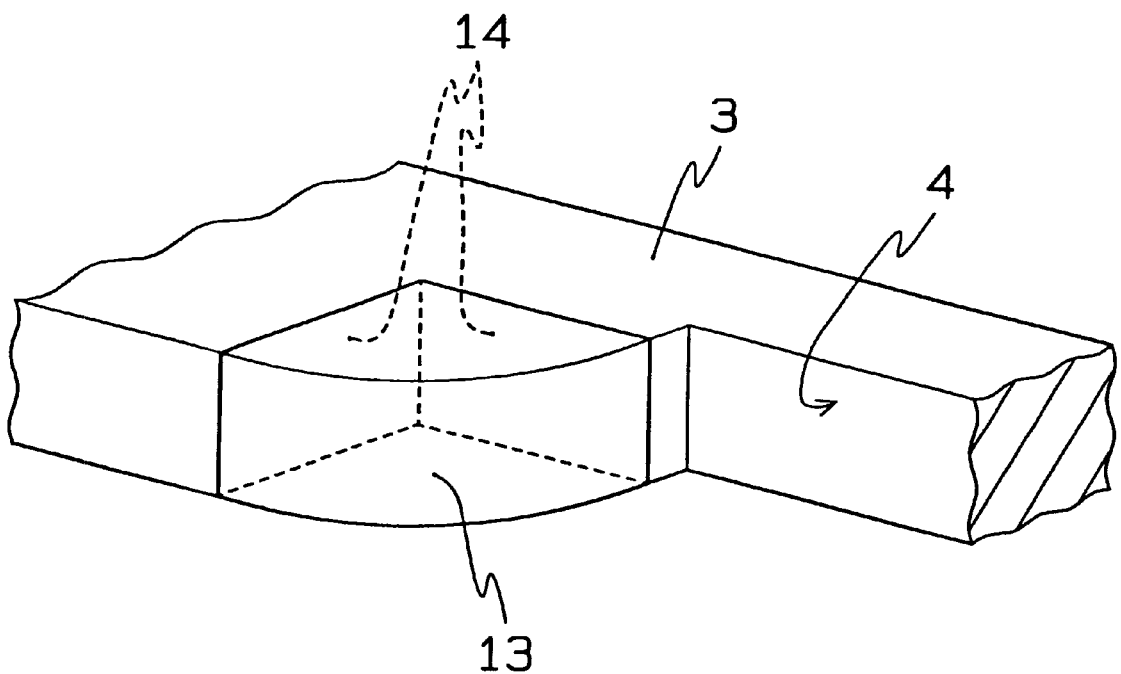
FIG. 7 is a perspective view of a concave portion located on a right-hand side of a retention member of a sheet-like light source device according to Embodiment 4 of the present invention.

FIG. 7 is a perspective view of a concave portion located on a right-hand side of a retention member of a sheet-like light source device according to Embodiment 4 of the present invention. In Embodiment 4, a transparent resin molded body 13 is provided as a light-transmitting means at the concave portion 4 of the retention member 3. According to the sheet-like light source of Embodiment 4, the surface portion of the concave portion 4 of the retention member 3 which opposes the light emitting surface of the convex portion of the light-conducting plate 1 is transparent, so that hardly any light emitting from the light-conducting plate is scattered at this portion but is scattered at a boundary surface 14 between the retention member 3 and the transparent resin molded body 13 upon passing through the transparent resin molded body 13. Display regions of the display will not be affected through abnormal emission of light not because abnormal emission of light is absorbed but because such abnormality is generated further outside (within the retention member), and it is consequently possible to maintain the display quality of the display after all.

Similarly to Embodiment 2, the transparent resin molded body 13 might be formed as a separate member through molding or cutting processing or through two-colored molding. In case of two-colored molding, the resin material shall be one which mighy be colored to be both white as well as transparent and colorless and which exhibits favorable adhesiveness of adhering surfaces of resin of different colors, and examples of preferably used materials are polycarbonate (PC), PC-ABS, ABS or acrylic resin.

Embodiment 5

Figure 8:
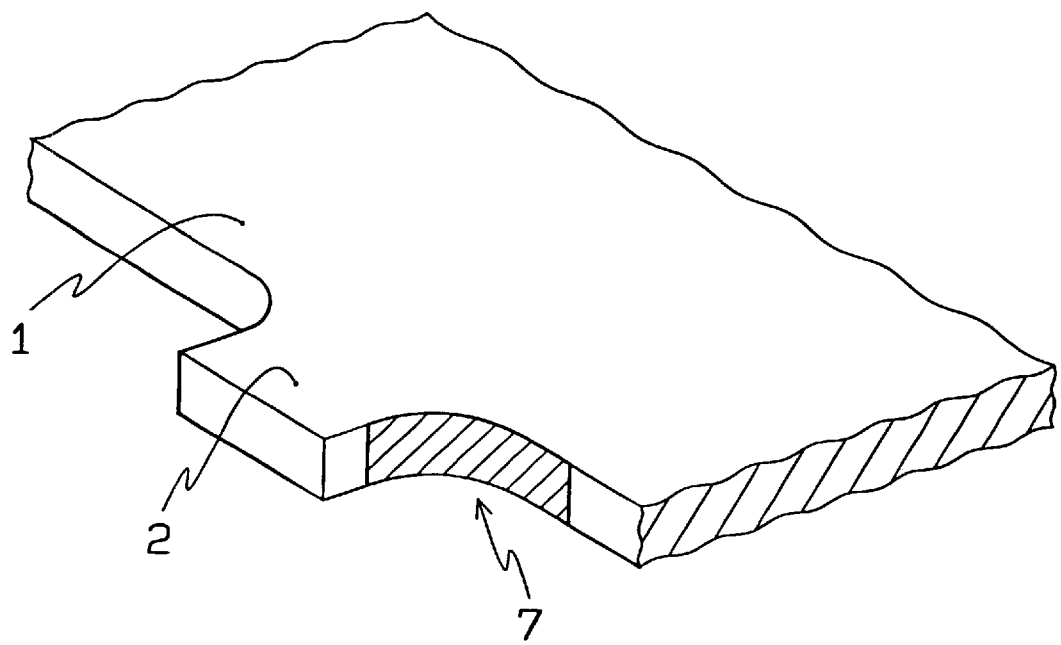
FIG. 8 is a perspective view showing a convex portion on a right-hand side of a light-conducting plate of a sheet-like light source device according to Embodiment 5 of the present invention, the portion being shown from a side opposite of a light-incident portion.
Figure 9:
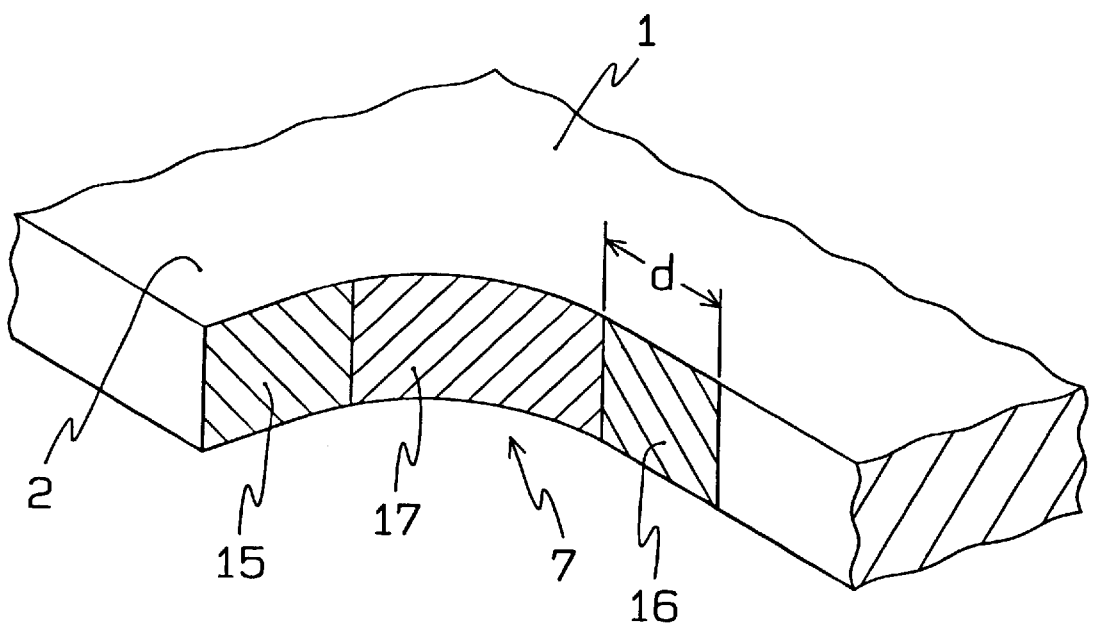
FIG. 9 is a view for explaining a region to be coated.

FIG. 8 is a perspective view showing a convex portion on a right-hand side of a light-conducting plate of a sheet-like light source device according to Embodiment 5 of the present invention, the portion being shown from a side opposite of a light-incident portion, and FIG. 9 is a view for explaining a region to be coated. While the light-absorbing means were provided at the concave portion of the retention member in the above Embodiments 1 to 4, the light-absorbing member 7 is provided on a surface portion corresponding to the light emitting surface of the light-conducting plate 1. In Embodiment 5, a colored coating is applied to these portions, similarly to Embodiment 1. It should be noted that regions for coating the colored coating is shown as hatched portions in FIGS. 8 and 9 for ease of understanding. While the coating region shall at least be R surface portion 17 which connects A plane 15 and B plane 16 as illustrated in FIG. 9, it is preferable to coat A plane 15 and B plane 16 as well. The coating regions of, for instance, the A plane 15 and B plane 16 are suitably determined within a range onto which leakage light (emitting light) hits, wherein a maximum range for A plane 15 is the entire surface while that for B plane 16 is set to be approximately d=5 mm from a boundary with the R surface portion 17.

The colored coating might be a commercially available one such as oil ink, acrylic coating or lacquer coating, similarly to Embodiment 1. The colored coating might be applied by using a pen, a brush or a spray upon completion of the light-conducting plate 1.

It should be noted that while the colored coating used in Embodiment 5 is a black or gray coating, the present invention is not limited to such black or gray coating as long as the color exhibits a function of absorbing emitting light in problem.

According to the sheet-like light source device of Embodiment 5, light emitting from the surface portion of the convex portion 2 of the light-conducting plate 1 which is located remote from the light-incident portion 5 is absorbed immediately before emission by the colored coating which serves as the light-absorbing means 7 of the light-conducting plate 1 so as to restrict emission of light at these portions, and it is consequently possible to eliminate occurrence of abnormal emission of light and to maintain the display quality of the display.

Since the light-absorbing means 7 is provided on a portion at which abnormal emission of light will be problematic, light which is emitting from other portions of the lateral surface of the light-conducting plate 1 will be reflected at the retention member 3 and returned to the light-conducting plate 1 without being absorbed, and it is possible to prevent degradations in luminance.

It should be noted that while the light-absorbing means 7 has been formed by coating a colored coating, it is alternatively possible to form the same by transferring a colored film, for instance, a film with a colored layer being formed on a surface thereof or a film impregnated with a coloring agent (pigment), onto the same region through application of heat or pressure. While various transferring methods might be employed, it is possible to put the film to specified position upon completion of the light-conducting plate 1 and applying heat or pressure from above, or, in case the light-conducting plate 1 is formed by injection molding, it is also possible to transfer the film by inserting the film into the mold at the time of molding.

Embodiment 6

Figure 10:
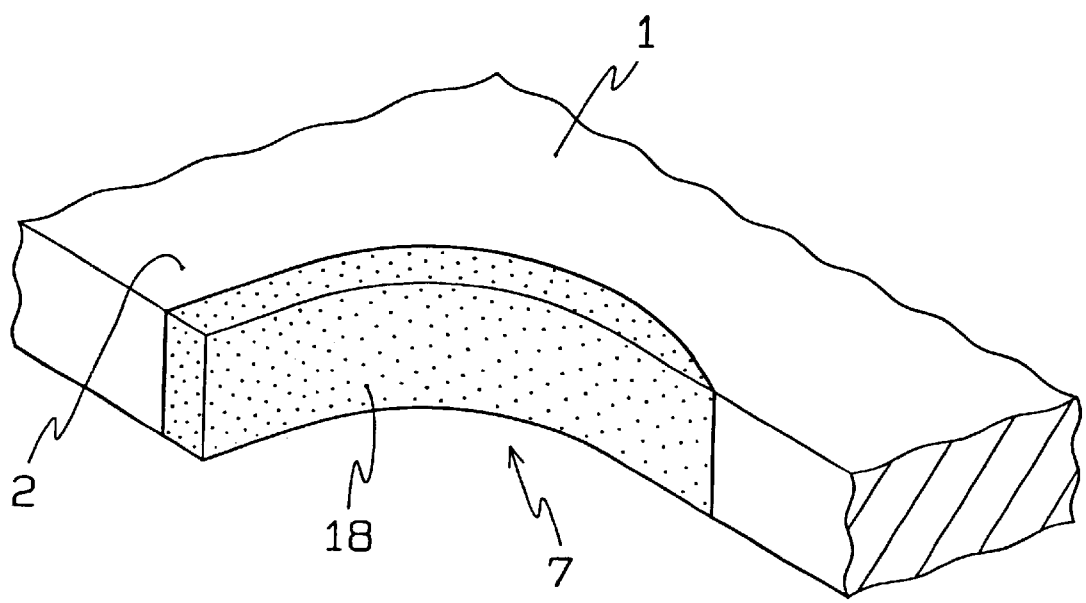
FIG. 10 is a perspective view showing a convex portion on a right-hand side of a light-conducting plate of a sheet-like light source device according to Embodiment 6 of the present invention, the portion being shown from a side opposite of a light-incident portion.

FIG. 10 is a perspective view showing a convex portion on a right-hand side of a light-conducting plate of a sheet-like light source device according to Embodiment 6 of the present invention, the portion being shown from a side opposite of a light-incident portion. In Embodiment 6, a colored resin molded body 18 is provided on the surface portion of the convex portion 2 of the light-conducting plate 1 which is partially notched.

The dimension of the colored resin molded body 18 is set such that at least the dimension of a surface opposing the retention member is identical to the coating region as described in the above Embodiment 5 (see FIG. 9). No abnormal emission of light will be generated also in Embodiment 6 due to the same principle as that of Embodiment 5, and since light emitting from the lateral surface of the light-conducting plate will hardly be absorbed by the retention plate 3, it is possible to realize a display of favorable display quality and free of degradations in luminance. While it is preferable that the colored resin molded body 18 is black or gray, the color is not limited to black or gray, as already mentioned in the above Embodiment 1, as long as the color exhibits functions of absorbing emitting light.

The colored resin molded body 18 might be formed as a separate member through molding or cutting processing similarly to the above Embodiment 2, and it is alternatively possible to form the same through so-called two-colored molding in case the light-conducting plate 1 is formed through injection molding, wherein the light-absorbing portion is formed by using colored resin and the remaining portions by using white resin. In performing two-colored molding, the resin material shall be one which is colorless and transparent and which is colored while exhibiting favorable adhesiveness of adhering surfaces of resin of different colors, and examples of preferably used materials are polycarbonate (PC), cycloolefin or acrylic resin.

Embodiment 7

Figure 11:
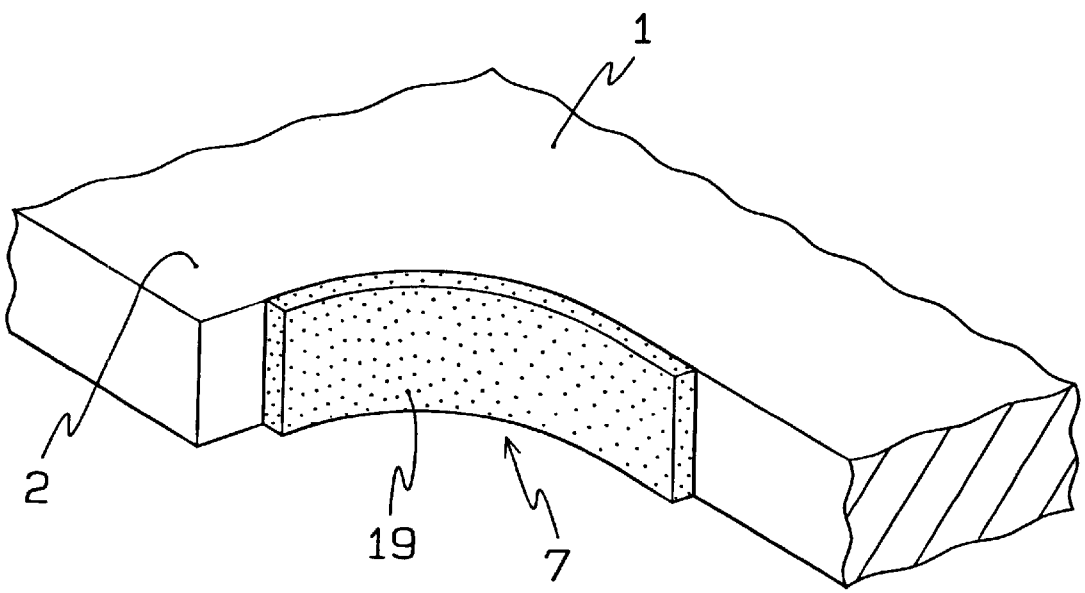
FIG. 11 is a perspective view showing a convex portion on a right-hand side of a light-conducting plate of a sheet-like light source device according to Embodiment 7 of the present invention, the portion being shown from a side opposite of a light-incident portion.
Figure 12:
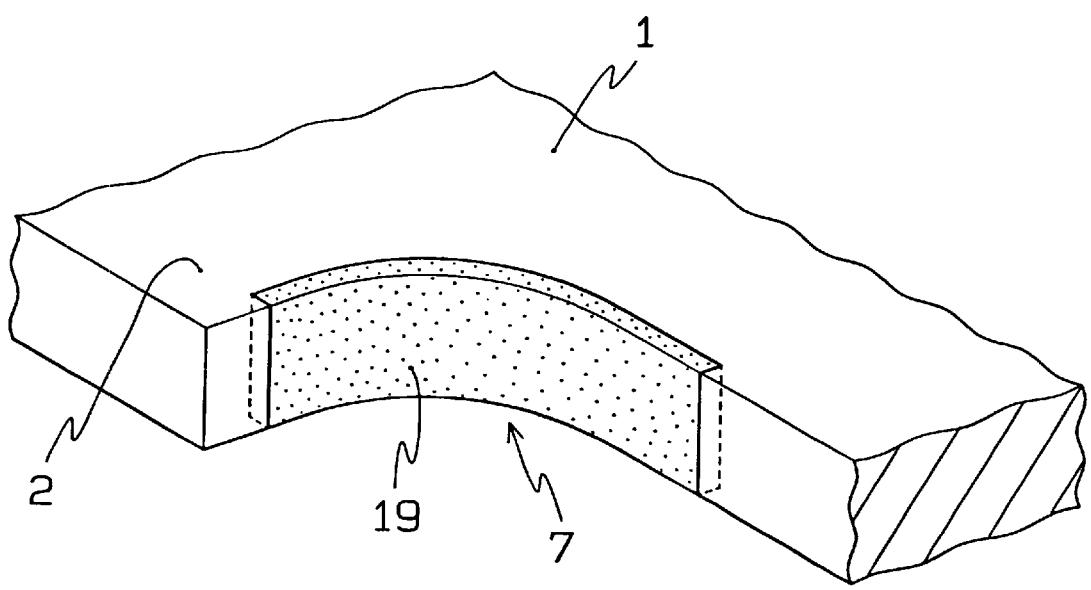
FIG. 12 is a view showing another way of adhering a colored tape.

FIG. 11 is a perspective view showing a convex portion on a right-hand side of a light-conducting plate of a sheet-like light source device according to Embodiment 7 of the present invention, the portion being shown from a side opposite of a light-incident portion, and FIG. 12 is a view showing another way of adhering a colored tape. As illustrated in FIGS. 11 and 12, a colored tape 19 is adhered to the surface portion of the convex portion 2 opposing the light-incident portion of the light-conducting plate 1 or the surface portion at which the convex portion 2 is partially notched to serve as the light-absorbing means 7. The same effects as those of Embodiments 5 to 6 might be achieved also in Embodiment 7. The dimension of the colored tape 19 shall be set such that the dimension of a surface opposing the retention member 3 is identical to the coating region as described in the above Embodiment 5 (see FIG. 9). Further, while it is preferable that the colored tape 19 is black or gray, the color is not limited to black or gray, as long as the color exhibits functions of absorbing emitting light.

The colored tape 19 is preferably one which is as thin as possible and which is of favorable stability of adhesiveness, and it might, for instance, be a tape or a cellophane tape using PET as a base material and having a thickness of approximately several tens of $\mu$m. In this case, the tape might be directly adhered to the surface portion (outside surface) of the light-conducting plate 1 as illustrated in FIG. 11 without causing any problems in view of clearance between the light-conducting plate 1 and the retention member 3. In case of adhering a thick tape such as a cushioned tape formed of silicon rubber or the like, it is preferable to employ a shape in which the surface portion of the light-conducting plate 1 is cut by a thickness of the tape as illustrated in FIG. 12. It should be noted that it is of course possible to employ the arrangement of FIG. 12 also in case of employing a tape of small thickness.

It should note noted that while the above explanations of the embodiments have been made in view of the right-hand side of the sheet-like light source device only, it goes without saying that the same measures are taken on the left-hand side as well.

While explanations have been made of an arrangement in which convex portions are formed on lateral surfaces of the light-conducting plate and concave portions on the lateral surfaces of the retention member, it is also possible to realize a display of favorable display quality and free of degradations in luminance while eliminating abnormal emission of light by providing the same means as in Embodiments 1 to 7 to an arrangement in which concave portions are formed on the light-conducting plate and convex portions on the retention member to fit with the convex portions.

While convex portions or concave portions of the light-conducting plate and the concave portions and convex portions of the retention member are respectively formed on both lateral side portions thereof in the sheet-like light source device of the above embodiments, the present invention is not limited to this arrangement, and the present invention is also applicable to a sheet-like light source device which is arranged with at least one convex portion or concave portion on lateral sides of the light-conducting plate and the retention member as long as the light-conducting plate might be retained in a specified positional relationship.

Figure 13:
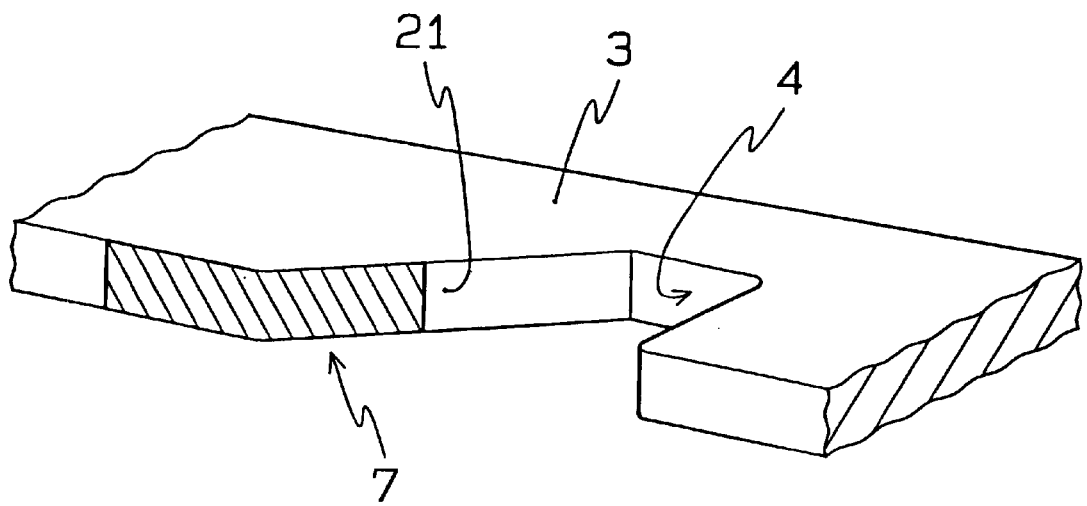
FIG. 13 is a perspective view showing an alternative shape of a retention member.
Figure 14:
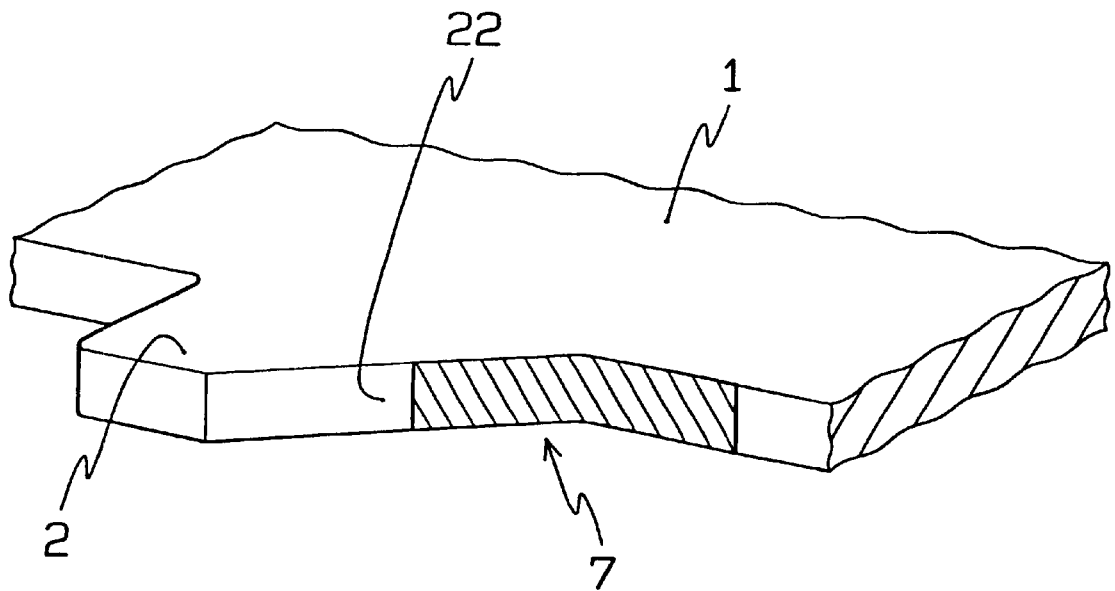
FIG. 14 is a perspective view showing an alternative shape of a light-conducting plate.
Figure 15:
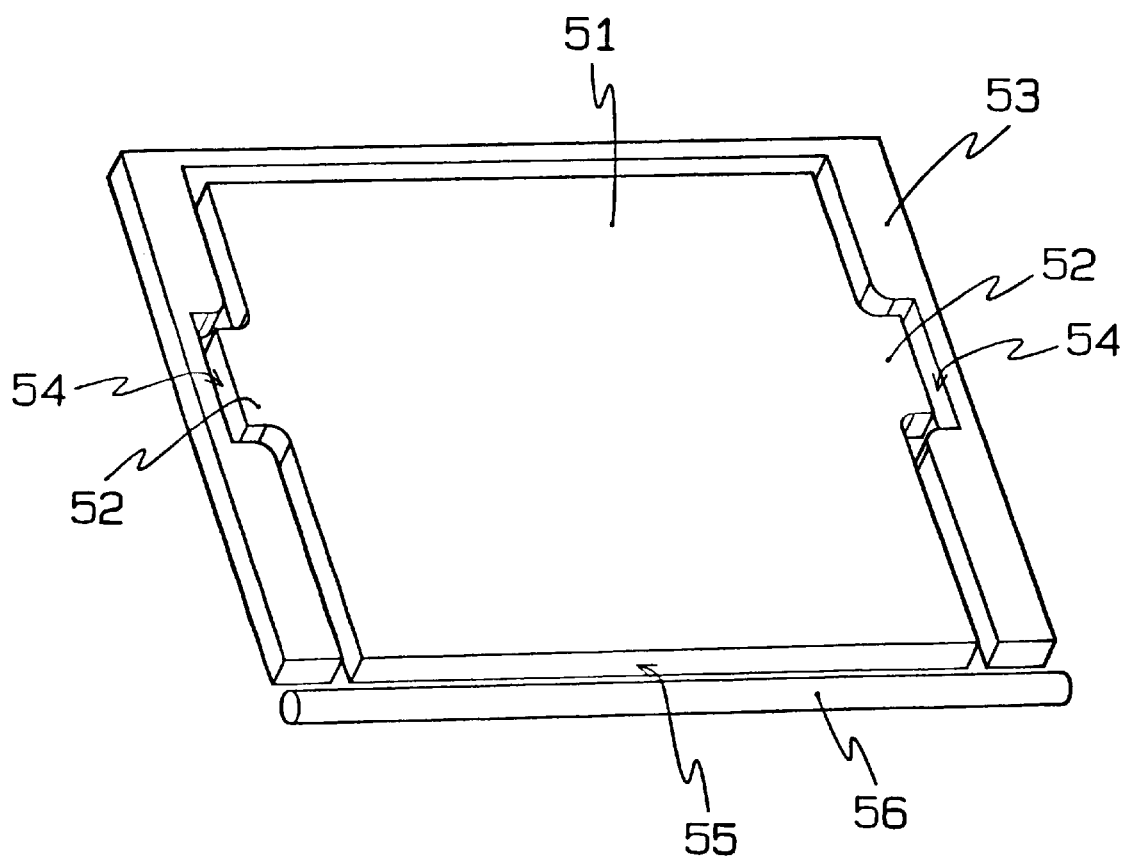
FIG. 15 is a partial perspective view showing an example of a conventional sheet-like light source device.
Figure 16:
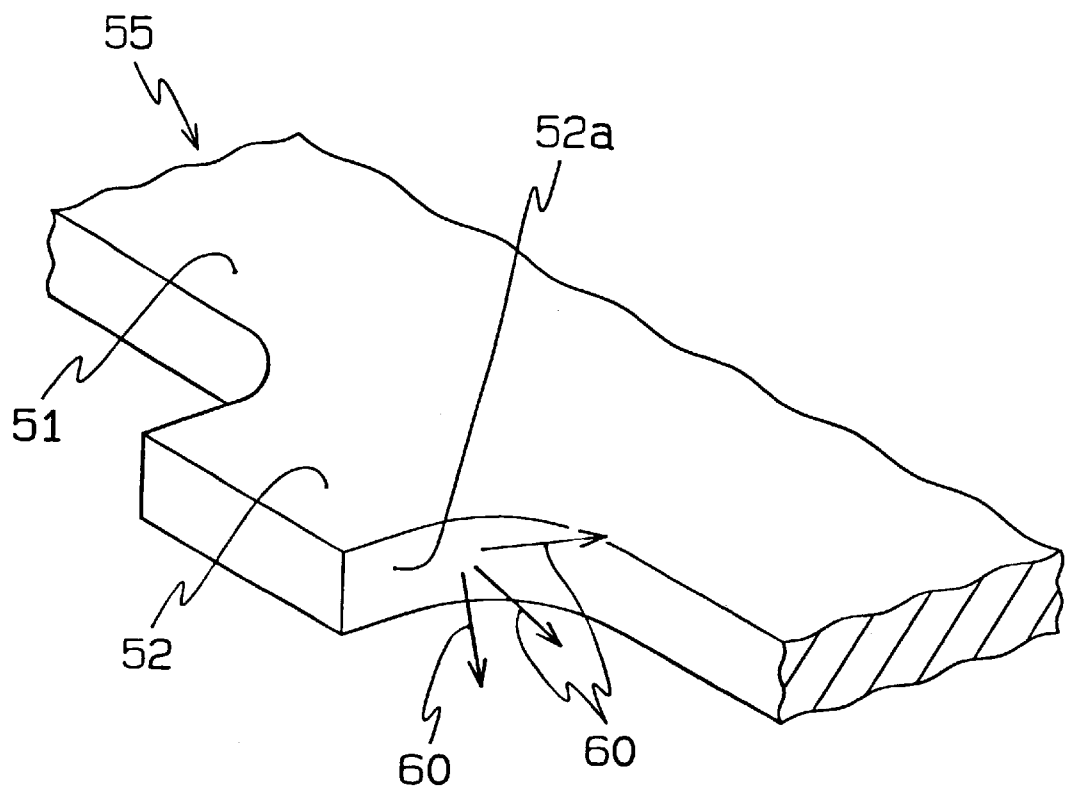
FIG. 16 is a perspective view of a convex portion located on a right-hand side of a light-conducting plate of the conventional sheet-like light source device.
Figure 17:
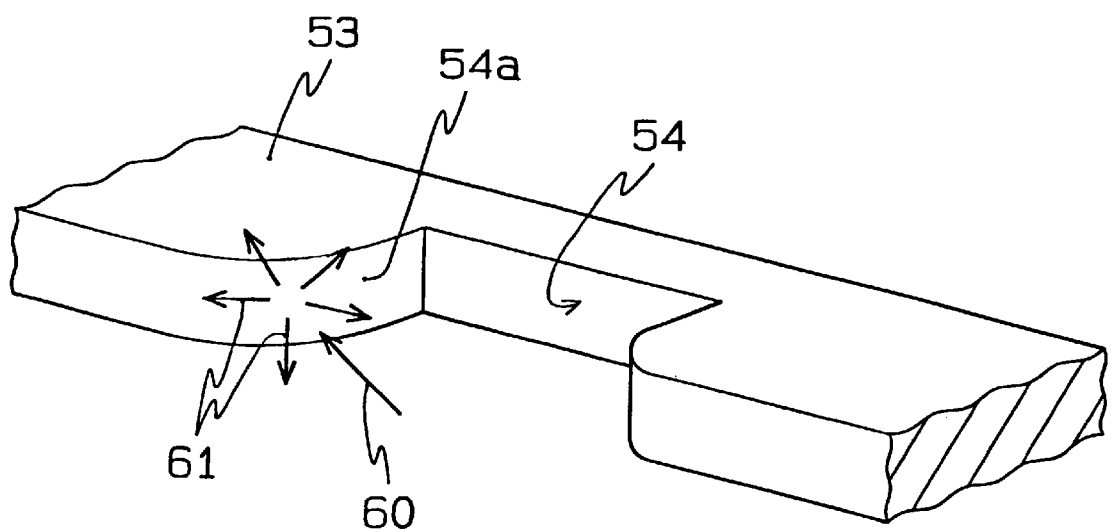
FIG. 17 is a perspective view of a convex portion located on a right-hand side of a retention member of the conventional sheet-like light source device.

Moreover, while the surfaces opposing the light-incident portions of the light-conducting plates of convex portions formed on lateral sides of the light-conducting plates and concave portions of the retention members comprised the R surfaces and the parallel surfaces in the above Embodiments 1 to 7, the present invention is not limited to this arrangement. The light-absorbing means 7 might be similarly provided also in case corner portions 21 of the concave portions 4 of the retention member 3 and corner portions 22 of convex portions 2 of the light-conducting plate 1 are not formed with the R surface and the parallel surface as illustrated in FIGS. 13 and 14. It is also possible to employ an arrangement in which the relationship between convex portions 2 and concave portions 4 of the light-conducting plate 1 and the retention member 3 are reversed while similar effects as those of the above embodiments might be achieved by taking the same measures.

As explained so far, according to the present invention, it is possible to eliminate occurrence of abnormal emission of light and decreases in luminance so that the display quality of the display might be maintained.

What is claimed is:

1. A sheet-like light source device of edge-light type comprising at least a light source, a light-conducting plate and a retention member for retaining the light-conducting plate, wherein at least one convex portion or concave portion is provided on a lateral surface portion of the light-conducting plate other than a light-incident portion with the light-conducting plate being held in a specified positional relationship by means of the retention member formed with a concave portion or a convex portion which fits with the convex portion or concave portion of the light-conducting plate, and wherein a light-absorbing means is provided on at least a surface portion of either surface of the concave portion or convex portion of the retention member which opposes the light-incident portion of the light-conducting plate.

2. The sheet-like light source device of claim 1, wherein the light-absorbing means comprises a colored coating or a colored film.

3. A sheet-like light source device of edge-light type comprising at least a light source, a light-conducting plate and a retention member for retaining the light-conducting plate, wherein at least one convex portion or concave portion is provided on a lateral surface portion of the light-conducting plate other than a light-incident portion with the light-conducting plate being held in a specified positional relationship by means of the retention member formed with a concave portion or a convex portion which fits with the convex portion or concave portion of the light-conducting plate, and wherein a light-absorbing means is provided on at least a surface portion of either surface of the concave portion or convex portion of the retention member which opposes the light-incident portion of the light-conducting plate, and wherein the light-absorbing means comprises a colored resin molded body.

4. The sheet-like light source device of claim 3, wherein the colored resin molded body is a resin molded body formed by two-colored molding.

5. The sheet-like light source device of claim 1, wherein the light-absorbing means comprises a colored tape.

6. A sheet-like light source device of edge-light type comprising at least a light source, a light-conducting plate and a retention member for retaining the light-conducting plate, wherein at least one convex portion or concave portion is provided on a lateral surface portion of the light-conducting plate other than a light-incident portion with the light-conducting plate being held in a specified positional relationship by means of the retention member formed with a concave portion or a convex portion which fit with the convex portion or concave portion of the light-conducting plate, and wherein a light-transmitting means is provided on at least a surface portion of either surface of the concave portion or convex portion of the retention member which opposes the light-incident portion of the light-conducting plate.

7. The sheet-like light source device of claim 6, wherein the light-transmitting means comprises a transparent resin molded body.

8. The sheet-like light source device of claim 7, wherein the transparent resin molded body is a resin molded body formed by two-colored molding.

9. A sheet-like light source device of edge-light type comprising at least a light source, a light-conducting plate and a retention member for retaining the light-conducting plate, wherein at least one convex portion or concave portion is provided on a lateral surface portion of the light-conducting plate other than a light-incident portion with the light-conducting plate being held in a specified positional relationship by means of the retention member formed with a concave portion or a convex portion which fit with the convex portion or concave portion of the light-conducting plate, and wherein a light-absorbing means is provided on at least a surface portion of a light emitting surface of either surface of the convex portion or concave portion of the light-conducting plate.

10. The sheet-like light source device of claim 9, wherein the light-absorbing means comprises a colored coating or a colored film.

11. A sheet-like light source device of edge-light type comprising at least a light source, a light-conducting plate and a retention member for retaining the light-conducting plate, wherein at least one convex portion or concave portion is provided on a lateral surface portion of the light-conducting plate other than a light-incident portion with the light-conducting plate being held in a specified positional relationship by means of the retention member formed with a concave portion or a convex portion which fits with the convex portion or concave portion of the light-conducting plate, and wherein a light-absorbing means is provided on at least a surface portion of a light emitting surface of either surface of the convex portion or concave portion of the light-conducting plate, and wherein the light-absorbing means comprises a colored resin molded body.

12. The sheet-like light source device of claim 11, wherein the colored resin molded body is a resin molded body formed by two-colored molding.

13. The sheet-like light source device of claim 9, wherein the light-absorbing means comprises a colored tape.

* * * * *